Sept. 11, 1934.　　　　　E. L. SUTTER　　　　　1,973,514
MANIFOLD CONNECTION FOR AUTOMOBILE HEATERS
Filed March 7, 1932
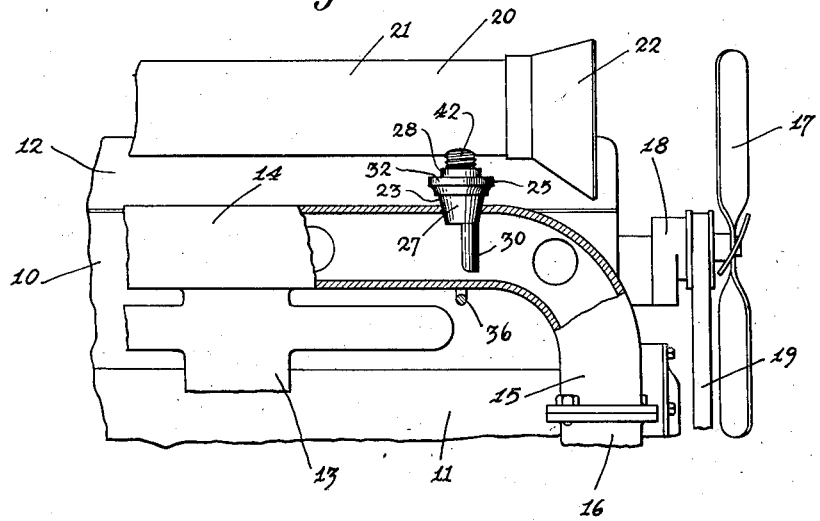
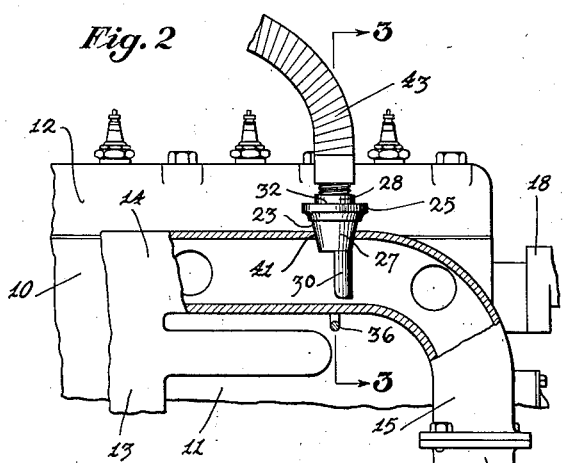
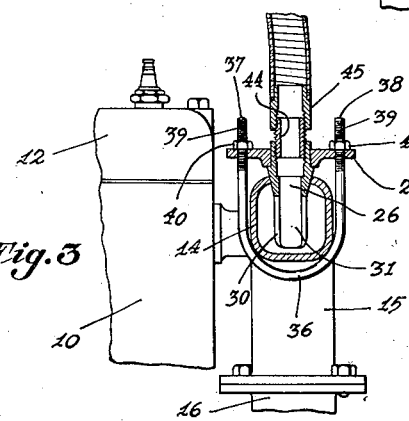
Inventor
Erwin L. Sutter
By Caswell & Lagaard
Attorneys Patented Sept. 11, 1934

1,973,514

UNITED STATES PATENT OFFICE 1,973,514

MANIFOLD CONNECTION FOR AUTOMOBILE HEATERS

Erwin L. Sutter, St. Paul, Minn., assignor to Kleve J. Flakne, Minneapolis, Minn.

Application March 7, 1932, Serial No. 597,282

2 Claims. (Cl. 257—241)

My invention relates to manifold connections for automobile heaters and has for an object to provide a connection whereby an automobile exhaust heater may be readily and easily connected to the manifold of an automobile without rebuilding or altering the construction of the automobile.

Another object of the invention resides in providing a connection which may be applied to any make of automobile.

A still further object of the invention resides in constructing the connection with a tubular fitting having a conical neck adapted to be inserted into an opening in the exhaust manifold of the automobile engine.

A feature of the invention resides in constructing the fitting with a shoulder adjacent the larger end of said conical neck.

Another object of the invention resides in providing the yoke adapted to engage the shoulder of said fitting and in further providing a U-bolt encircling the manifold and extending through said yoke and having nuts screwed upon the threaded ends thereof for drawing the conical neck of said fitting into the opening of the automobile engine manifold.

An object of the invention resides in forming said shoulder by reducing the diameter of the fitting adjacent the larger end of said neck.

A still further object of the invention resides in providing the fitting with a semitubular spoon at the end of the neck opposite the shoulder, said spoon being of a diameter less than the diameter of said opening and the diameter of the smaller end of the neck and being insertable into the manifold through said opening.

Another object of the invention resides in providing another fitting in the nature of a plug, constructed similarly to said tubular fitting and adapted to be interchangeably received within the opening in said manifold and to be held in place through said yoke for closing the opening in the manifold when the heater is not desired for use.

Other objects of the invention reside in the novel combination and arrangements of parts and in the details of construction hereinafter illustrated and/or described.

In the drawing:

Fig. 1 is a side elevational view of a portion of an automobile engine with a part of the manifold cut away and having a connection illustrating an embodimet of my invention attached thereto and directly supporting the heater.

Fig. 2 is a view similar to Fig. 1 showing a conduit leading from the connection to a remotely positioned heater.

Fig. 3 is an elevational sectional view taken on line 3—3 of Fig. 2.

Fig. 4 is a perspective view of the tubular fitting forming a part of the connection.

Fig. 5 is a perspective view of the yoke of the connection.

Fig. 6 is a perspective view of the plug forming part of the invention.

In the manufacture of exhaust gas heaters for automobiles, considerable expense has been heretofore involved in production equipment, due to the extremely great number of different kinds and types of automobiles now being manufactured and previously manufactured. In addition, it has been necessary to carry a large stock of connections, many of which were never sold. The present invention overcomes these disadvantages by providing a single type of manifold connection which may be quickly and readily attached to the exhaust manifold of any type of automobile and which may be used to deliver exhaust gases to any desired type or form of heater.

For the purpose of illustrating the application of my invention, I have shown a part of an automobile engine 10 which comprises a cylinder block 11 having a cylinder head 12 secured thereto. This engine further includes an intake manifold 13 and an exhaust manifold 14 both of usual construction. The exhaust manifold 14 in the engine illustrated is provided with a forwardly discharging end 15 which communicates with the exhaust pipe 16 leading to the muffler of the automobile. At the forward part of the engine 10 is mounted the usual cooling fan 17 whereby the cooling liquid of the engine is maintained at proper temperature. This fan is mounted on a bracket 18, attached to the cylinder block and is driven through a belt 19 from the crank shaft of the engine (not shown in the drawing). In operation, the fan 17 draws air through the radiator and forces the same rearwardly along the engine proper.

Although my fitting may be used in conjunction with any type of exhaust gas heater, I have shown in the drawing merely for illustration, a heater indicated in its entirety at 20. This heater is of the type illustrated in my co-pending application for patent, Serial No. 378,195, filed July 15, 1929, which has since matured into Patent No. 1,853,585, dated April 12, 1932 and consists of a case 21 having a longitudinal air passageway extending completely therethrough and in which is disposed a suitable heating element. A bell 22 at the forward end of the case 21 directs the air set in motion by the fan 17 through the air passageway of the heater proper where the same is heated and from which the heated air may be conducted from the heater and into the cab of the automobile in any suitable manner.

My invention proper includes a tubular pipe fitting 23, another fitting 24 in the nature of a plug and a clamp which I have indicated in its entirety at 25. These parts will now be described in detail.

The fitting 23 is tubular in form and is constructed with a bore 26 extending completely therethrough. This fitting is formed with a conical neck 27 intermediate the ends thereof and is reduced in diameter at one end to form a bushing 28 leaving a shoulder 29 on said fitting at the larger end of the neck 27. The bushing 28 is internally threaded as indicated at 29a. At the smaller end of the neck 27 is disposed a semi-tubular spoon 30 which is of an external diameter substantially equal to the lesser diameter of the conical neck 27. This spoon is formed with a semicircular passageway 31 which lies in continuation of the bore 26.

The clamp 25 consists of a yoke 32 which is formed with a central opening 33 adapted to receive the bushing 28 of the fitting 23. The yoke 32 is further formed at its ends with two holes 34 and 35 which are spaced apart a distance slightly greater than the width of the largest size of manifold to which the fitting may be applied. The clamp 25 further includes a U-bolt 36 whose ends 37 and 38 are threaded as indicated at 39 and which are adapted to extend through the holes 34 and 35 in the yoke proper. Nuts 40 are screwed upon the ends 37 and 38 of the U-bolt 36 and serve to move said yoke into clamping position.

In the application of the connection to the manifold, the manifold is first drilled with a hole 41 of a diameter larger than the lesser diameter of the conical neck 27 and less than the greater diameter of said neck. This hole may, if desired, be tapered to fit the taper of said neck. Where the heater is to be directly supported on the pipe connection 23, as shown in Fig. 1, the yoke 32 is first placed over the bushing 28 and a nipple 42 screwed into the threads 29a of bushing 28 and into the heating element of the heater proper. The fitting 23 is next turned so that the spoon 30 will extend in the proper direction when applied to the manifold. The fitting is next inserted into the conical hole 41 and the U-bolt 36 inserted about the manifold with the ends 37 and 38 thereof extending through the two holes 34 and 35 of the yoke 32. Nuts 40 may next be applied to the threads 39 thereof and the said nuts tightened down. As the nuts 40 are tightened, the conical neck 27 of the fitting is drawn into the hole 41 and tightly wedged therein. This forms a fluid tight connection between the fitting and the manifold whereby a portion of the exhaust gases may be conducted along the passageway 31 of spoon 30 and through the bore 26 of the fitting and into the heater proper.

Where the heater is not to be supported upon the fitting, a suitable flexible or similar conduit 43 is employed, which is connected to the fitting 23 through a nipple 44 and a suitable coupling 45 directly connected to the conduit 43. By means of this conduit the exhaust gases may be led to the heater which can be mounted at any suitable location and which may be of any desired type. The installation of the invention when applied to such types of heaters is exactly the same as previously described.

In summer, when the heater is not desired for use, the tubular fitting 23 may be removed and the fitting 24 substituted in place thereof. This fitting is similar to the fitting 23, being formed with a tapered neck 46 identical with the neck 27. The fitting 24 is reduced in diameter as indicated at 47 to form a shoulder 48 corresponding with the shoulder 29 of the other fitting, and is formed without a bore and without a spoon. In assembly the plug 24 is inserted into the opening 41, the same as fitting 23 and clamped in place by means of the U-bolt 36 and the yoke 32. When properly attached, this fitting serves to close the opening through the exhaust manifold. The plug 24 may also be used in the event that the heater is to be permanently disconnected or in the event the heater is to be temporarily disconnected and when installed offers no appreciable resistance to the passage of exhaust gases through the exhaust manifold.

My invention is highly advantageous in that it may be readily applied to any form of automobile engine. The device is rapidly mounted and when properly attached, provides a fluid tight connection. With my invention, only a portion of the exhaust gas is conducted into the heater so that the entire exhaust gas passageway is not closed. The fitting is insertable through the opening in the exhaust manifold and requires no adjustment or manipulation from within the manifold and has no moving parts to become loose and to cause vibration after attachment.

Changes in the specific form of my invention as herein disclosed may be made within the scope of what is claimed, without departing from the spirit of my invention.

Having described my invention, what I claim as new and desire to protect by Letters Patent is:

1. A fitting for automobile heaters consisting of a take-off conduit having a conical neck for application to a hole in the exhaust manifold of an automobile engine, said neck having an integral semi-tubular spoon at the smaller end thereof for disposition within the manifold and having an integral bushing at its larger end internally threaded to receive a nipple to be coupled with the heater, the outer diameter of the bushing being less than the diameter of said larger end of the neck, said neck forming a shoulder adjacent said bushing, a yoke having a bore therein to receive said bushing, said shoulder forming a seat for the yoke in position on said bushing, and means attached to said yoke and adapted to embrace said manifold for drawing said neck tightly into said opening in the manifold.

2. A fitting for automobile heaters consisting of a take-off conduit having a conical neck for application to a hole in the exhaust manifold of an automobile engine, said neck having an integral semi-tubular spoon at the smaller end thereof for disposition within the manifold and having an integral bushing at its larger end internally threaded to receive a nipple to be coupled with the heater, the outer diameter of the bushing being less than the diameter of said larger end of the neck, said neck forming a shoulder adjacent said bushing, the internal diameter of said bushing being greater than the internal diameter of the semi-tubular spoon to accommodate a nipple of internal diameter not less than that of said spoon, a yoke having a bore therein to receive said bushing, said shoulder forming a seat for the yoke in position on said bushing, and means attached to said yoke and adapted to embrace said manifold for drawing said neck tightly into said opening in the manifold.

ERWIN L. SUTTER.